United States Patent [19]
Polutnik

[11] Patent Number: 6,009,899
[45] Date of Patent: Jan. 4, 2000

[54] VARIABLE ORIFICE DUAL GATE VALVE

[75] Inventor: John E. Polutnik, Versailles, Pa.

[73] Assignee: Power & Industrial Services Corporation, Morgan, Pa.

[21] Appl. No.: 09/261,623

[22] Filed: Mar. 3, 1999

[51] Int. Cl.[7] ...................................................... F16K 3/00
[52] U.S. Cl. ................... 137/556.3; 251/212; 251/249.5
[58] Field of Search ..................... 251/212, 326, 251/329, 248, 249.5; 137/556, 556.3

[56] References Cited

U.S. PATENT DOCUMENTS

| | | | |
|---|---|---|---|
| 2,810,394 | 10/1957 | Ferguson | 251/212 X |
| 4,090,534 | 5/1978 | Martin et al. | 251/212 X |
| 4,182,359 | 1/1980 | Rickard | 251/212 X |
| 4,531,359 | 7/1985 | Jandrasi et al. | 251/212 X |
| 4,760,989 | 8/1988 | Elliott et al. | 251/249.5 X |
| 5,538,037 | 7/1996 | Pizao | 137/556 |

FOREIGN PATENT DOCUMENTS

| | | | |
|---|---|---|---|
| 2714933 | 10/1978 | Germany | 251/212 |

Primary Examiner—Kevin Lee
Attorney, Agent, or Firm—Carothers & Carothers

[57] ABSTRACT

A variable orifice dual gate valve having two opposed slidable valve gates in overlapping sliding contact relationship. Inner orifice edges of these plates coact to form a variable size orifice in the valve body upon simultaneously sliding of the valve gates in opposite directions through manipulation of a gear and screw drive mechanism. The gear and screw drive mechanism includes a handle drive shaft connected at an exposed end to a valve handle and a drive gear is secured to the other end of the handle drive shaft for axial rotation. This drive gear is meshed in driving engagement with two driven gears that in turn are respectively secured to drive right hand lead screw and left hand lead screw shafts. A right hand follower nut and a left hand follower nut are respectively threadably received on these lead screw shafts and gate slide drive shafts are in turn secured to these nuts respectively for follower movement with the nuts. These gate slide valves are slidably received in slide guides in the valve body for guided axial sliding movement and they are also respectively connected to the valve gates for simultaneously sliding the gates in opposite directions upon rotation of the valve handle to adjust the orifice of the valve.

4 Claims, 3 Drawing Sheets

VARIABLE ORIFICE DUAL GATE VALVE

BACKGROUND OF THE INVENTION

The present invention relates generally to valves and more particularly to variable orifice dual gate valve construction especially designed to control flow of viscous liquids and for other mixtures as solid, or semisolid bearing fluids, such as pulverized fuel flow for coal burning industrial furnaces.

Gate valves manufactured of materials which are resistant to wear and erosion are commonly used to feed pulverized coal and air mixtures to industrial furnaces as fuel. The mixture is normally transported at a rate of 7,500 feet per minute and at a temperature of 120° to 180° F. The adjustment of the valve orifice is generally regulated by a single valve gate or dual valve gates which are operated from a single handle, but with dual actuators for the respective valve gate. Such dual actuator systems are expensive to manufacture and assemble and are prone to misalignment and binding. In addition, it is difficult to provide an accurate indicator for such valves to indicate a percentage of open area of the orifice of the valve in operation.

It is a principal object of the present invention to eliminate these aforementioned disadvantages of the prior art dual gate valves.

SUMMARY OF THE INVENTION

The variable orifice dual gate valve of the present invention includes a valve body with inlet and outlet openings. Two opposed slidable valve gates are mounted in the valve body in overlapping sliding contact relationship and these valve gates have inner orifice edges which coact to form a variable size orifice in the valve body upon sliding of the valve gates in opposite directions.

A gear and screw drive mechanism is connected for driving the valve gates in opposite directions with the manipulation of a single valve handle carried by the valve body. The present invention resides in a novel single actuator system for simultaneously operating both gates in opposite directions.

The gear and screw drive mechanism utilized in the dual gate valve of the present invention includes a handle drive shaft that is connected at an exposed end to the valve handle and this handle drive shaft is mounted for axial rotation in the valve body. A drive gear positioned within the valve body is secured to this handle drive shaft for axial rotation therewith and is meshed in driving engagement with two driven gears.

A right hand lead screw shaft and a left hand lead screw shaft are respectively secured to these driven gears for respective axial rotation with the driven gears. In addition, a right hand follower nut and a left hand follower nut are respectively threadably received on the right hand screw shaft and the left hand lead screw shaft.

Gate slide drive shafts are secured respectively to these nuts for movement with the nuts and these shafts are slidably received in respective slide guides in the valve body for guided axial sliding movement. These gate slide drive shafts are respectively connected to the valve gates for simultaneously sliding the valve gates in opposite directions upon rotation of the valve handle for thereby adjusting the orifice in the valve body with a single actuator.

The respective coacting inner orifice edges of the valve gates are preferably concave to better control the valve orifice and to maintain the orifice centrally located within the valve body.

The valve gates are also preferably coated with wear resistant ceramic material to reduce wear caused by the flow of pulverized coal or other abrasive materials.

An indicator pointer is connected to one of the driven follower nuts and an indicator scale is connected to the other of the driven follower nuts on the respective right hand and left hand lead screw shafts. The indicator pointer and scale are positioned relative to each other on an exterior portion of the valve body for indicating open area of the valve orifice thereby permitting the operator accurate knowledge of the orifice opening.

BRIEF DESCRIPTION OF THE DRAWINGS

Other objects and advantages appear hereinafter in the following description and claims. The accompanying drawings show, for the purpose of exemplification, without limiting the invention or appended claims, certain practical embodiments of the invention wherein:

DETAILED DESCRIPTION OF A PREFERRED EMBODIMENT

Figure 1:
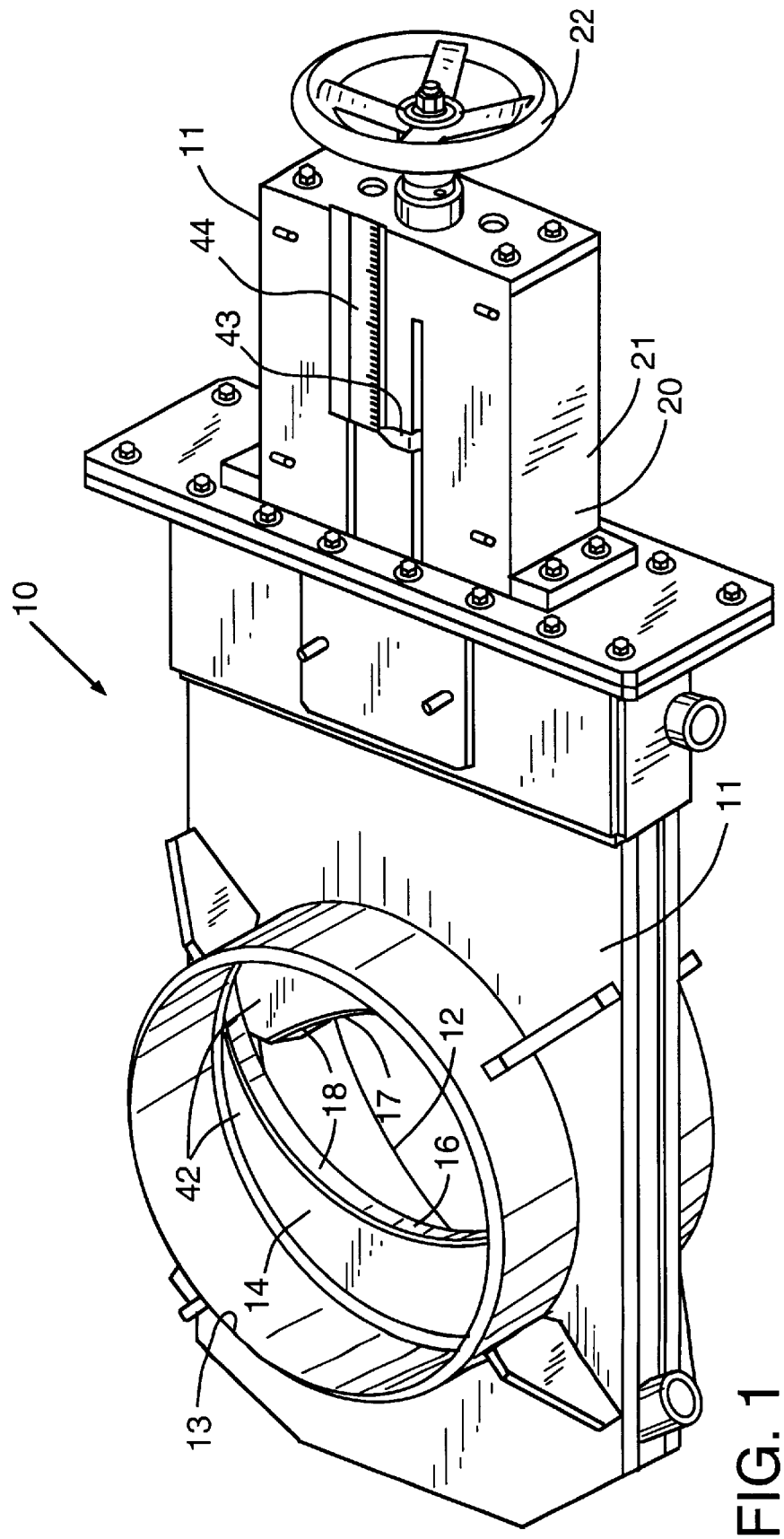
FIG. 1 is a perspective view of the variable orifice dual gate valve of the present invention.
Figure 2:
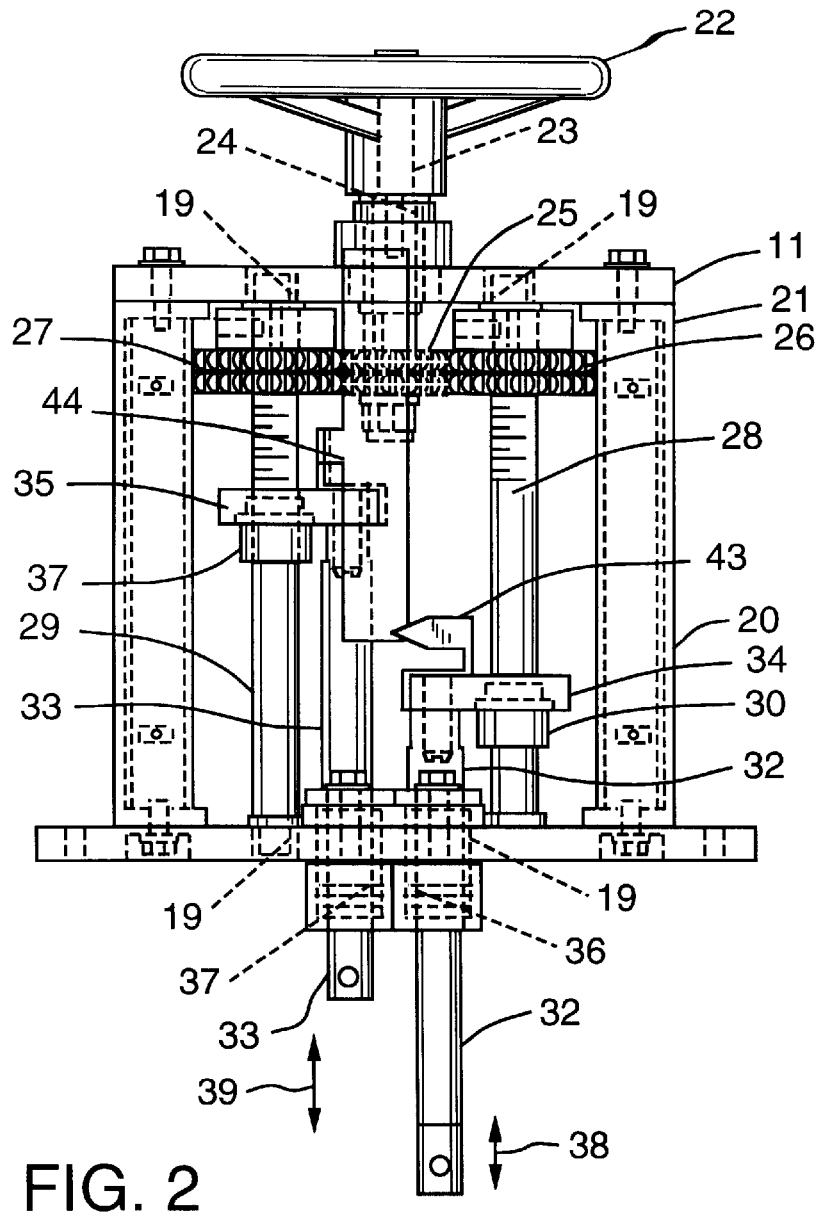
FIG. 2 is a view in front elevation of the gear and drive screw mechanism utilized to operate the variable orifice dual gate valve of the present invention as shown alone in FIG. 1 and which is shown separated from the remainder of the valve body and with the cover plate for the housing thereof removed to expose the interior.
Figure 3:
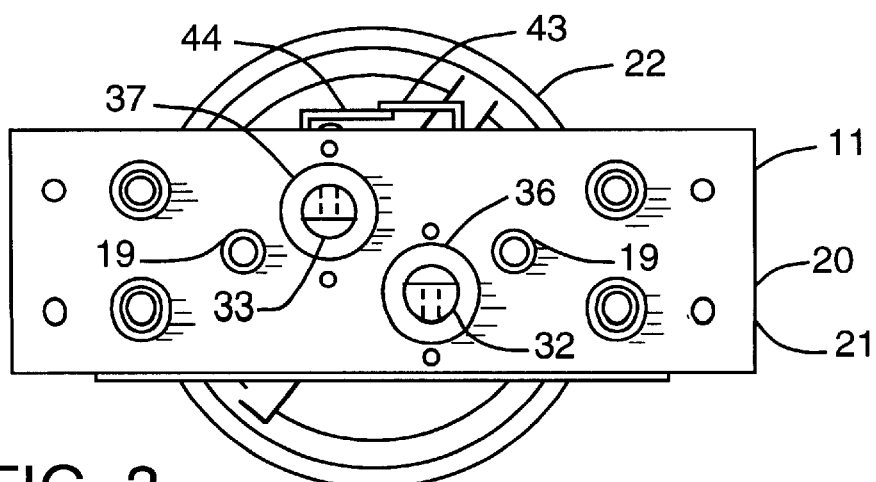
FIG. 3 is a bottom view of the gear and screw drive mechanism shown in FIG. 2.
Figure 4:
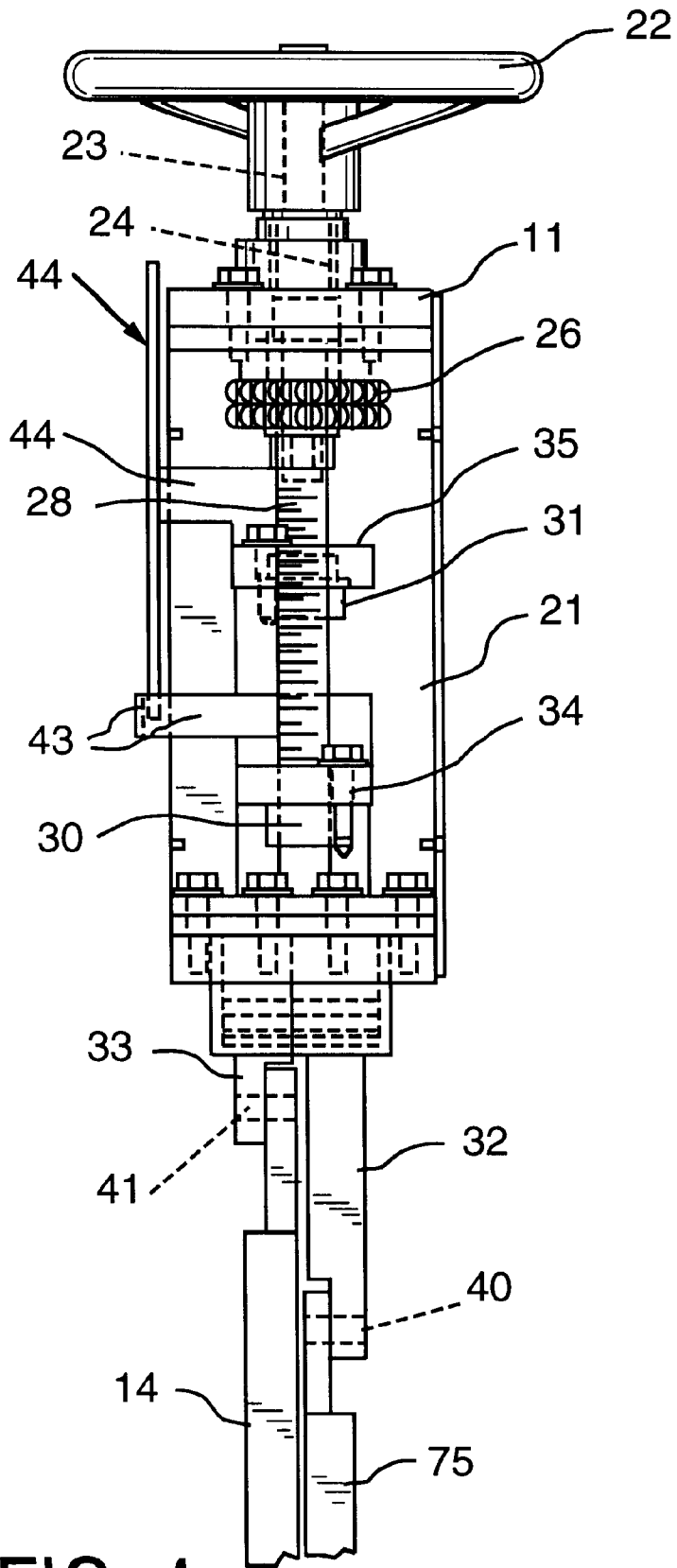
FIG. 4 is a view in side elevation of the gear and screw drive mechanism shown in FIG. 2 with the side cover panel for the housing thereof removed to expose the interior and further illustrating portions of the valve gates as they are attached to the mechanism.

Referring to the drawings, the variable orifice dual gate valve 10 of the present invention is provided with a valve body 11 with an inlet opening 12 and an outlet opening 13. Two opposed slidable gates 14 and 15 are mounted in valve body 11 in overlapping sliding contact relationship. Valve gates 14 and 15 have inner concave orifice edges 16 and 17 respectively which coact to form a variable size orifice 18 in the valve body 11 upon simultaneous sliding of the valve gates 14 and 15 in opposite directions.

A gear and screw drive mechanism 20 is housed in end housing 21 of valve body 11 and is connected for simultaneously driving the valve gates 14 and 15 in opposite directions with the manipulation of the single valve handle 22.

The gear and drive screw mechanism 20 includes a handle drive shaft 23 connected at its exposed end from housing 11 to the valve handle 22. This handle drive shaft 23 is mounted for axial rotation in valve body 11 as indicated at sleeve bearing 24. A drive gear 25 is secured to the inner end of handle drive shaft 23 for axial rotation therewith. This drive gear 25 is meshed in driving engagement with two driven gears 26 and 27.

A right hand lead screw shaft 28 and a left hand lead screw shaft 29 are respectively secured to the driven gears 26 and 27 for respective axial rotation with these gears and are further mounted for axial rotation in end bearings 19 in housing 11. A right hand follower nut 30 and a left hand follower nut 31 are respectively threadably received on the right hand screw shaft 28 and the left hand screw shaft 29.

Gate slide drive shafts 32 and 33 are secured respectively to nuts 30 and 31 through respective coupling plates 34 and 35 for movement with nuts 32 and 33. These gate slide drive shafts 32 and 33 are slidably received in respective slide guides 36 and 37 in the valve body 11 for guided axial sliding movement as indicated by arrows 38 and 39.

The gate slide drive shafts 32 and 33 are respectively connected to the valve gates 15 and 14 for simultaneously sliding the valve gates 15 and 14 in opposite directions upon rotation of valve handle 22 for thereby adjusting the orifice 18 in the valve body 11. The respective gate slide drive shafts 32 and 33 are connected to the gates 15 and 14 respectively through the use of respective pin connections 40 and 41.

The exposed surfaces 42 of gates 14 and 15 are of a wear resistant ceramic to resist abrasive wear.

An indicator pointer 43 is connected to right hand follower nut 30 through coupling plate 34 and indicator scale 44 is connected to the other follower left hand nut 31 through coupling plate 35 and the indicator pointer 43 and the indicator scale 44 are positioned relative to each other on an exterior portion of valve body 11 for indicating open area of the orifice 18.

I claim:

1. In a variable orifice dual gate valve having a valve body with inlet and outlet openings, two opposed slidable valve gates mounted in the valve body in overlapping sliding contact relationship, the valve gates having inner orifice edges coacting to form a variable size orifice in the valve body upon sliding of the valve gates in opposite directions, and a gear and screw drive mechanism connected for driving the valve gates in opposite directions with the manipulation of a single valve handle carried by the valve body, the improvement comprising the gear and screw drive mechanism including a handle drive shaft connected at an exposed end to the valve handle and mounted for axial rotation in the valve body, a drive gear secured to said handle drive shaft for axial rotation therewith, the drive gear meshed in driving engagement with two driven gears, a right hand lead screw shaft and a left hand lead screw shaft respectively secured to the driven gears for respective axial rotation therewith, a right hand follower nut and a left hand follower nut respectively threadably received on the right hand lead screw shaft and left hand lead screw shaft, gate slide drive shafts secured respectively to the nuts for movement therewith and slidably received in respective slide guides in the valve body for guided axial sliding movement, the gate slide drive shafts respectively connected to the valve gates for simultaneously sliding the valve gates in opposite directions upon rotation of the valve handle for thereby adjusting the orifice in the valve body.

2. The variable orifice dual gate valve of claim 1 wherein the respective coacting inner orifice edges of the valve gates are concave.

3. The variable orifice dual gate valve of claim 2 wherein the valve gates have a wear resistant ceramic coating.

4. The variable orifice dual gate valve of claim 1 an indicator pointer connected to one of the nuts and an indicator scale connected to the other one of the nuts, and the indicator pointer and the indicator scale positioned relative to each other on an exterior portion of the valve body for indicating open area of the orifice.

* * * * *